Patented Sept. 26, 1950

2,523,892

UNITED STATES PATENT OFFICE 2,523,892

EXTRACTION PROCESS FOR CERIUM

James C. Warf, Los Angeles, Calif., assignor to the United States of America as represented by the United States Atomic Energy Commission No Drawing. Application May 12, 1949, Serial No. 92,957

19 Claims. (Cl. 23—23)

This invention deals with the separation of cerium from aqueous solutions by solvent extraction, and, in particular, with the separation of cerium from other elements commonly associated therewith, including the other rare earth elements. The invention also deals with the extraction of cerium from said solvent. The invention also deals with the preparation of pure cerium dioxide, pure cerium salts, and with a process of purifying cerium compounds.

It is an object of this invention to provide a process for the separation of cerium by solvent extraction.

It is another object of this invention to provide a process for separating cerium from an organic solvent solution thereof.

In accordance with this invention, cerium may be easily separated from the other rare earth elements and other materials associated therewith by extracting it in its tetravalent state from an acid solution by means of nitromethane. In this extraction process, the addition of a salting-out agent has a very advantageous effect on the distribution coefficient of Ce(IV) in favor of the solvent phase and thus increases the yield of cerium.

In choosing the solvent suitable for the process of this invention, care had to be taken that the solvent is not attacked by the strong oxidizing power of the tetravalent cerium, which would result in the reduction of the cerium to the nonextractable trivalent stage. Nitromethane was found to be satisfactorily resistant to the oxidizing influence of cerium and also to have a high extraction potency. These properties make nitromethane ideally suitable for the extraction of tetravalent cerium salts.

As has been mentioned above, the process has to be carried out in an acid aqueous solution. Mineral acids, e. g. hydrochloric acid and nitric acid are preferred; however, the most favorable results were obtained with nitric acid. While the acid concentration may range from 1 to 6 M, a concentration of from 3 to 6 M is preferred. The acid solution of the cerium salt may be obtained directly by dissolving cerium or its oxide, or it may be obtained by the addition of the desired amount of concentrated acid to an aqueous solution of cerium salt. When free acid is used, it is preferred that the concentration be at least 2 M; however, the initial concentration of the acid is by no means critical.

In the extraction process of the present invention, a highly water-soluble nitrate or chloride, and nitric acid or hydrochloric acid, have been used as salting-out agents. Other inorganic salts that are very soluble in water have been found to be suitable as the salting-out agent. It is preferred to employ one or a mixture of any of the following metal nitrates: $NaNO_3$, $Ca(NO_3)_2$, $KNO_3$, $Sr(NO_3)_2$, $LiNO_3$, $Mg(NO_3)_2$, $NH_4NO_3$, $La(NO_3)_3$, $Mn(NO_3)_2$, $Al(NO_3)_3$. The actual molar concentration desirable for the inorganic salt used will depend upon the valence of the cation and the concentration of the anion desired. In general, the salt concentration ranges between 3 and 12 M.

In most cases, it is desirable to have a metal salt, such as a metal nitrate, together with free mineral acid, such as nitric acid or hydrochloric acid, present in the solution to be treated. It is preferred that the metal salt be the predominant component of the mixture of salting-out agents. For example, when the aqueous solution is 1 M $HNO_3$, it is desirable to employ a concentration of a univalent nitrate of at least 3 M, and preferably of from 3 to 12 M. Equivalent concentrations of polyvalent nitrates are employed at the same acid concentration. With increase or decrease in acid strength the salt concentration is accordingly decreased or increased, respectively, to provide an equivalent anion concentration for the salting out of cerium. When other water-soluble inorganic salts are used, they are added in quantities such as to provide equivalent concentrations.

The concentration of the ceric salt in the aqueous solution to be treated with the extracting solvent may be varied greatly; for example, ceric nitrate was extracted satisfactorily from aqueous solutions having concentrations ranging from 0.2 to about 2 M.

It will be understood that in case that the cerium salt to be recovered is in the trivalent stage, oxidation is carried out prior to extraction. This may be accomplished either by electrolysis or by chemical methods. Bromate in strong nitric acid, in particular sodium bromate in 8 to 10 M nitric acid, proved especially satisfactory for the oxidation of Ce(III) to Ce(IV).

In order to study the effect of changes in the concentrations of the various ingredients on the operativeness of the process, a number of experiments were carried out using ceric nitrate as the salt to be treated and nitric acid as the acid. In these tests, the time of contact of the solvent with the aqueous ceric nitrate solution varied between twenty and sixty minutes. First, solutions 0.5 M in ceric nitrate and 1 M in ammonium nitrate, but with varying nitric acid strengths, were extracted each with an equal volume of nitromethane; the results are shown in Table I. Analogous experiments were then made with solutions containing 0.5 M in ceric nitrate, 3 M in ammonium nitrate, and also with varying nitric acid molarity; the results of these experiments are shown in Table II.

*Table I*

| Molarity of Nitric Acid | Per Cent Cerium Extracted |
|---|---|
| 0 | 0.2 |
| 1 | 1 |
| 2 | 3 |
| 3 | 9 |
| 4 | 19 |
| 5 | 30 |
| 6 | 38 |
| 7 | 39 |

*Table II*

| Molarity of Nitric Acid | Per Cent Cerium Extracted |
|---|---|
| 0 | 0.8 |
| 2 | 8 |
| 4 | 28 |

Thereafter extraction experiments were made from solutions having 0.5 M ceric nitrate, 3 M nitric acid, and which varied in the concentration of ammonium nitrate. The results are shown in Table III.

*Table III*

| Molarity of Ammonium Nitrate | Per Cent Cerium Extracted |
|---|---|
| 0 | 5 |
| 1 | 9 |
| 2 | 12 |
| 3 | 17 |
| 4 | 21 |
| 5 | 29 |
| 6 | 31 |

The effect of changes in the ceric nitrate concentration was studied by extracting solutions 3 M in nitric acid and 4 M in ammonium nitrate. The results are listed in Table IV.

*Table IV*

| Molarity of Ceric Nitrate | Percent Cerium Extracted |
|---|---|
| 0.1 | 26 |
| 0.3 | 22 |
| 0.5 | 21 |
| 0.7 | 22 |
| 0.9 | 25 |

The data in Tables I, II, III, and IV indicate that reasonable amounts of cerium can be extracted by nitromethane from solutions 3 to 6 M in nitric acid, 3 to 5 M in ammonium nitrate and 3 to 5 M total concentration of both and up to 1 M in ceric nitrate. Concentrations of ammonium nitrate above about 5 M and of nitric acid above about 6 M improve the extractions only slightly while reducing the amount of ceric nitrate that can be dissolved in the aqueous phase.

Moreover, comparative experiments were carried out using calcium nitrate as the salting-out agent. For these tests, cerium nitrate was prepared by precipitating ceric hydroxide from a sulfatoceric acid solution with ammonia water, filtering and washing the precipitate, and dissolving it in nitric acid. Analysis showed the resulting solution to be 1 M in ceric nitrate and 1.1 M in nitric acid. Nitric acid and varying quantities of calcium nitrate were added to a number of aliquots, yielding solutions 3 M in nitric acid and 0.5 M in ceric nitrate. These aliquots were extracted each with an equal volume of nitromethane, and the organic phases obtained were analyzed for cerium. The results are presented in Table V.

*Table V*

| Molarity of Calcium Nitrate | Percent Cerium Extracted |
|---|---|
| 0 | 5 |
| 1 | 14 |
| 2 | 42 |
| 3 | 58 |
| 4 | 86 |
| 5 | 87 |

It is evident from Table V that calcium nitrate is a more effective salting-out agent than ammonium nitrate, one mole of the former being roughly equivalent to four moles of the latter.

The next experiment was for the purpose of studying the effect of a calcium nitrate-ammonium nitrate mixture as the salting-out agent. In this experiment ammonium hexanitratocerate, calcium nitrate and nitric acid were dissolved in enough water to give a solution 0.5 M in ceric nitrate, 1 M in ammonium nitrate, 2 M in calcium nitrate and 3 M in nitric acid. This solution was shaken ten minutes with an equal volume of nitromethane and then allowed to stand for twenty minutes; the layers were then separated and both were titrated with ferrous sulfate. The analyses showed that 59% of the cerium was extracted by the nitromethane and that only 5% had been reduced. The use of the calcium nitrate-ammonium nitrate mixture combines the advantage of the high salting-out ability of the $Ca(NO_3)_2$ and that of the availability of the ammonium hexanitratocerate; as has been shown, good extraction is obtained.

In order to recover the cerium from the nitromethane solutions, the solvent was evaporated and the residue then ignited. A pure ceria of white color was obtained. However, the cerium may also be extracted by means of water since, as obvious from Table I, the extraction coefficient for Ce(IV) favors the aqueous phase if nitric acid-free water is used. Another preferred embodiment of back-extraction comprises the reduction of Ce(IV) in the solvent phase to CE(III) and subsequent extraction with water. By the use of these combination processes, cerium is purified, an aqueous solution of pure cerium salt being obtained in all cases. The cerium salt can then be converted to the metal by conventional means, such as by precipitation of the cerium as an oxalate, ignition of the precipitate to form the dioxide, treatment of the latter with HF to produce $CeF_4$, which is then finally reduced by reaction with an alkali or alkaline earth metal, such as calcium, at elevated temperature.

Well-known extraction procedures and apparatus may be used in carrying out the process of the present invention. Thus, the extraction steps may be effected by the use of batch, continuous batch, batch countercurrent, or continuous countercurrent methods. An especially efficient extraction is obtained using the continuous countercurrent method of extraction. In all cases the ratio of liquid organic solvent to initial aqueous solution may vary widely and the optimum ratio will depend upon the particular organic solvent and the concentrations used. Ratios of between 1 and 10 are preferred. The organic solvent may be either the dispersed phase or the continuous phase, the former, however, being the preferred type.

The foregoing illustrations and embodiments of this invention are not intended to restrict its scope, which is to be limited entirely by the appended claims.

What is claimed is:

1. A method of separating tetravalvent cerium salts from acidified aqueous solutions, comprising contacting said aqueous solution with nitromethane whereby said cerium salt is extracted by said nitromethane, and separating a nitromethane phase from said aqueous phase.

2. A method of separating tetravalent cerium salts from rare earth metal salts, comprising converting said salts to an acidified aqueous solution thereof, contacting said aqueous solution with nitromethane whereby said cerium salt is extracted by said nitromethane, and separating a nitromethane phase from said aqueous phase.

3. A method of separating tetravelent cerium salts from acidified aqueous solutions, comprising adding a salting-out agent to said aqueous solution, contacting said aqueous solution with nitromethane whereby said cerium salt is extracted by said nitromethane, and separating a nitromethane phase from said aqueous phase.

4. A method of separating tetravalent cerium salts from aqueous solutions, comprising adding mineral acid to said aqueous solution, adding a salting-out agent, contacting said aqueous solution with nitromethane whereby said cerium salt is extracted by said nitromethane, and separating a nitromethane phase from said aqueous phase.

5. A method of separating tetravalent cerium salts from aqueous solutions, comprising adding hydrochloric acid to said aqueous solution, adding a salting-out agent, contacting said aqueous solution with nitromethane whereby said cerium salt is extracted by said nitromethane, and separating a nitromethane phase from said aqueous phase.

6. A method of separating tetravalent cerium salts from aqueous solutions, comprising adding nitric acid to said aqueous solution, adding a salting-out agent, contacting said aqueous solution with nitromethane whereby said cerium salt is extracted by said nitromethane, and separating a nitromethane phase from said aqueous phase.

7. A method of separating tetravalent cerium salts from aqueous solutions, comprising adding nitric acid to said aqueous solution so as to obtain a concentration in said aqueous solution of from 1 to 6 M nitric acid, adding a salting-out agent, contacting said aqueous solution with nitromethane whereby said cerium salt is extracted by said nitromethane, and separating a nitromethane phase from said aqueous phase.

8. A method of separating tetravalent cerium salts from aqueous solutions, comprising adding nitric acid to said aqueous solution so as to obtain a concentration in said aqueous solution of from 3 to 6 M nitric acid, adding a salting-out agent, contacting said aqueous solution with nitromethane whereby said cerium salt is extracted by said nitromethane, and separating a nitromethane phase from said aqueous phase.

9. The method of claim 7 in which the salting-out agent is an alkali nitrate.

10. The method of claim 9 in which the alkali nitrate is ammonium nitrate.

11. The method of claim 7 in which the salting-out agent is an alkaline earth nitrate.

12. The method of claim 11 in which the alkaline earth nitrate is calcium nitrate.

13. A method of separating tetravalent cerium salts from aqueous solutions, comprising adding nitric acid to said aqueous solution so as to obtain a concentration of from 1 to 6 M nitric acid, adding a nitrate salting-out agent in a quantity so as to obtain a concentration of from 3 to 12 M of said nitrate, contacting said aqueous solution with nitromethane whereby said cerium salt is extracted by said nitromethane, and separating a nitromethane phase from said aqueous phase.

14. A method of separating tetravalent cerium salt from aqueous solutions, comprising adding nitric acid and a nitrate salting-out agent in such quantities that a concentration is obtained in the solution ranging from 0.2 to 2 M for the cerium salt, from 3 to 12 M for the nitrate, and from 1 to 6 M for the nitric acid, contacting said aqueous solution with nitromethane whereby said cerium salt is extracted by said nitromethane, and separating a nitromethane phase from said aqueous phase.

15. A method of separating tetravalent cerium salt from aqueous solutions, comprising adding nitric acid and calcium nitrate in such quantities that the concentration obtained in the solution will be approximately 0.5 M for the ceric nitrate, about 5 M for the calcium nitrate, and about 3 M for the nitric acid, contacting said aqueous solution with nitromethane whereby said cerium salt is extracted by said nitromethane, and separating a nitromethane phase from said aqueous phase.

16. A method of separating tetravalent cerium salt from aqueous solutions, comprising adding nitric acid and a mixture of calcium and ammonium nitrates in such quantities that the concentration obtained in the solution will be about 0.5 M for the ceric nitrate, about 1 M for the ammonium nitrate, about 2 M for the calcium nitrate, and about 3 M for the nitric acid; contacting said aqueous solution with nitromethane whereby said cerium salt is extracted by said nitromethane; and separating a nitromethane phase from said aqueous phase.

17. A method of preparing pure cerium dioxide from an impure cerium compound, comprising converting said cerium compound into an aqueous ceric solution, adding nitric acid and a nitrate salting-out agent to said aqueous solution in quantities so as to adjust the concentrations to range from 0.2 to 2 M for the cerium salt, from 3 to 12 M for said nitrate, and from 1 to 6 M for the nitric acid, contacting said aqueous solution with nitromethane whereby said cerium salt is extracted by said nitromethane, separating a nitromethane phase from said aqueous phase, evaporating said nitromethane from said solvent phase, and igniting the residue obtained thereby.

18. A method of separating tetravalent cerium salt from aqueous solutions, comprising adding nitric acid and a nitrate salting-out agent in such quantities that a concentration is obtained in the solution ranging from 0.2 to 2 M for the cerium salt, from 3 to 12 M for the nitrate, and from 1 to 6 M for the nitric acid, contacting said aqueous solution with nitromethane whereby said cerium salt is extracted by said nitromethane, separating a nitromethane phase from said aqueous phase, and extracting said cerium salt from the nitromethane phase by means of water free from nitric acid.

19. A method of separating tetravalent cerium salt from aqueous solutions, comprising adding nitric acid and a nitrate salting-out agent in such quantities that a concentration is obtained in the solution ranging from 0.2 to 2 M for the cerium salt, from 3 to 12 M for the nitrate, and from 1 to 6 M for the nitric acid, contacting said aqueous solution with nitromethane whereby said cerium salt is extracted by said nitromethane, separating a nitromethane phase from said aqueous phase, reducing said ceric salt to the corresponding cerous salt, extracting said cerous salt with an aqueous medium, and recovering the cerium from the aqueous solution formed.

JAMES C. WARF.

REFERENCES CITED

The following references are of record in the file of this patent:

UNITED STATES PATENTS

| Number | Name | Date |
|---|---|---|
| 2,227,833 | Hixon | Jan. 7, 1941 |